United States Patent
Sripada et al.

(10) Patent No.: US 12,488,169 B1
(45) Date of Patent: Dec. 2, 2025

(54) PERFORMING TIMING CONSTRAINT EQUIVALENCE CHECKING ON CIRCUIT DESIGNS

(71) Applicant: Synopsys, Inc., Mountain View, CA (US)

(72) Inventors: Subramanyam Sripada, Hillsboro, OR (US); Gowrishankar N. J., Chikkamagalurur (IN); Shubhashish Rudra, Bangalore (IN); Ajit Sequeira, Bengaluru (IN)

(73) Assignee: SYNOPSYS, INC., Sunnyvale, CA (US)

( * ) Notice: Subject to any disclaimer, the term of this patent is extended or adjusted under 35 U.S.C. 154(b) by 660 days.

(21) Appl. No.: 18/047,922

(22) Filed: Oct. 19, 2022

Related U.S. Application Data (60) Provisional application No. 63/257,867, filed on Oct. 20, 2021.

(51) Int. Cl.
  *G06F 30/3312* (2020.01)
  *G06F 30/3323* (2020.01)
  *G06F 30/367* (2020.01)
  *G06F 30/396* (2020.01)
  *G06F 30/398* (2020.01)
  *G06F 119/12* (2020.01)

(52) U.S. Cl.
  CPC ...... *G06F 30/3312* (2020.01); *G06F 30/3323* (2020.01); *G06F 30/367* (2020.01); *G06F 30/396* (2020.01); *G06F 30/398* (2020.01); *G06F 2119/12* (2020.01)

(58) Field of Classification Search
  CPC ............ G06F 30/3312; G06F 30/3323; G06F 30/367; G06F 30/396; G06F 30/398; G06F 2119/12
  USPC ..... 716/108, 107, 113, 134, 136; 703/16, 19
  See application file for complete search history.

(56) References Cited

U.S. PATENT DOCUMENTS

| | | | | |
|---|---|---|---|---|
| 5,581,738 A | * | 12/1996 | Dombrowski | G06F 30/33 716/108 |
| 6,023,567 A | * | 2/2000 | Osler | G06F 30/3312 716/108 |
| 6,640,330 B1 | * | 10/2003 | Joshi | G06F 30/33 716/108 |
| 9,489,478 B2 | * | 11/2016 | Sequeira | G06F 30/396 |
| 2003/0056185 A1 | * | 3/2003 | Nakajima | G06F 30/30 716/113 |
| 2010/0182859 A1 | * | 7/2010 | Kohler | G11C 8/08 365/201 |

(Continued)

FOREIGN PATENT DOCUMENTS

WO  WO-2011130376 A2 * 10/2011 ............. G06F 30/33

*Primary Examiner* — Phallaka Kik
(74) *Attorney, Agent, or Firm* — Laxman Sahasrabuddhe; Park, Vaughan, Fleming & Dowler LLP (57) ABSTRACT

A first set of timing relationships may be determined in a first circuit design based on a first set of timing constraints specified for the first circuit design. A second set of timing relationships may be determined in a second circuit design based on a second set of timing constraints specified for the second circuit design. The first set of timing relationships may be compared with the second set of timing relationships to obtain a comparison result. Equivalency between the first set of timing constraints and the second set of timing constraints may be determined based on the comparison result.

20 Claims, 9 Drawing Sheets

Determine a first set of timing relationships in the first circuit design based on a first set of timing constraints — 1202

Determine a second set of timing relationships in the second circuit design based on a second set of timing constraints — 1204

Compare the first set of timing relationships with the second set of timing relationships to obtain a comparison result — 1206

Determine equivalency between the first set of timing constraints and the second set of timing constraints based on the comparison result — 1208

(56) References Cited

U.S. PATENT DOCUMENTS

| | | | | |
|---|---|---|---|---|
| 2010/0324842 | A1* | 12/2010 | Di Iorio | G06F 18/00 |
| | | | | 702/60 |
| 2011/0252388 | A1* | 10/2011 | Singhal | G06F 30/3312 |
| | | | | 716/108 |
| 2012/0054331 | A1* | 3/2012 | Dagan | G06F 11/301 |
| | | | | 709/224 |
| 2013/0097567 | A1* | 4/2013 | Stevens | G06F 30/30 |
| | | | | 716/108 |
| 2016/0241890 | A1* | 8/2016 | Park | H04N 21/23439 |
| 2018/0255431 | A1* | 9/2018 | Robertson | G01C 21/005 |
| 2018/0357261 | A1* | 12/2018 | Danichev | G06F 17/40 |
| 2022/0083717 | A1* | 3/2022 | Lo | G06F 30/3323 |
| 2024/0232501 | A1* | 7/2024 | Liu | G06F 30/327 |

* cited by examiner

PERFORMING TIMING CONSTRAINT EQUIVALENCE CHECKING ON CIRCUIT DESIGNS

RELATED APPLICATION

This application claims the benefit of U.S. Provisional Application Ser. No. 63/257,867, filed on 20 Oct. 2022, the contents of which are herein incorporated by reference in their entirety for all purposes.

TECHNICAL FIELD

The present disclosure generally relates to an electronic design automation (EDA) system. More specifically, the present disclosure relates to performing timing constraint equivalence checking on circuit designs.

BACKGROUND

A circuit design, e.g., an integrated circuit (IC) design, may undergo netlist and timing constraints transformations during a circuit design flow. The netlist is expected to remain functionally equivalent before and after a transformation and the intent of the timing constraints is also expected to remain equivalent.

SUMMARY

Embodiments described herein may feature performing timing constraint equivalence checking on circuit designs. A first set of timing relationships may be determined in a first circuit design based on a first set of timing constraints specified for the first circuit design. A second set of timing relationships may be determined in a second circuit design based on a second set of timing constraints specified for the second circuit design. The first set of timing relationships may be compared with the second set of timing relationships to obtain a comparison result. Equivalency may be determined between the first set of timing constraints and the second set of timing constraints based on the comparison result. In some embodiments, each timing relationship may be specified using one or more timing start-points, a timing end-point, a launch clock, a capture clock, and a timing constraint state.

In some embodiments described herein, determining the first set of timing relationships in the first circuit design may include selecting a first set of timing points in the first circuit design, propagating a first set of tags from the first set of points, wherein first timing relationship information is collected as the first set of tags propagate through the first circuit design, and determining the first set of timing relationships based on the first timing relationship information.

In some embodiments described herein, determining the second set of timing relationships in the second circuit design may include selecting a second set of timing points in the second circuit design, propagating a second set of tags from the second set of points, wherein second timing relationship information is collected as the second set of tags propagate through the second circuit design, and determining the second set of timing relationships based on the second timing relationship information.

In some embodiments described herein, comparing the first set of timing relationships with the second set of timing relationships to obtain the comparison result may include performing a first comparison between (1) a first timing relationship in the first set of timing relationships which ends at a first timing end-point in the first circuit design, and (2) a second timing relationship in the second set of timing relationships which ends at a second timing end-point in the second circuit design, where the first timing end-point corresponds to the second timing end-point.

In some embodiments described herein, comparing the first set of timing relationships with the second set of timing relationships to obtain the comparison result may include performing a second comparison between (1) a third timing relationship in the first set of timing relationships which begins at a first timing start-point corresponding to the first timing end-point in the first circuit design, and (2) a fourth timing relationship in the second set of timing relationships which begins at a second timing start-point corresponding to the second timing end-point in the second circuit design, wherein the first timing start-point corresponds to the second timing start-point.

In some embodiments described herein, comparing the first set of timing relationships with the second set of timing relationships to obtain the comparison result may include performing a third comparison between (1) a fifth timing relationship in the first set of timing relationships at a first re-convergent point between the first timing start-point and the first timing end-point, and (2) a sixth timing relationship in the second set of timing relationships at a second re-convergent point between the second timing start-point and the second timing end-point, wherein the first re-convergent point corresponds to the second re-convergent point.

In some embodiments described herein, a name mapping may be used to determine correspondence between a first point (e.g., a first timing end-point, a first timing start-point, or a first re-convergence point) in the first circuit design and a second point (e.g., a second timing end-point, a second timing start-point, or a second re-convergence point) in the second circuit design.

BRIEF DESCRIPTION OF THE FIGURES

The disclosure can be understood based on the detailed description given below and the accompanying figures. The figures, examples and embodiments are for illustrative purposes, and do not limit the scope of the disclosure. Furthermore, the figures are not necessarily drawn to scale.

DETAILED DESCRIPTION

A circuit design can undergo several netlist and constraint transformations as the circuit design progresses from the register transfer level (RTL) state through the signoff stage in a circuit design flow. It is desirable to ensure that the netlist's functionality and the intent of the constraints remain the same across transformations.

Ensuring that constraints are consistent after a transformation is difficult to solve manually and is error prone. Approaches that perform an iterative pair-wise comparison of the constraint files may not be useful because a user may represent a constraint using different language constructs. For example, false paths may be specified using "set_false_path" timing constraints. However, false paths may also be represented using "set_clock_group" timing constraints, which may be a better approach. Specifying false paths using different approaches in different constraint files may cause an iterative pair-wise comparison of the constraint files to report an inconsistency when none exists. The "set_clock_group" command may be used to specify a relationship (e.g., asynchronous, logically exclusive, physically exclusive) between a group of clocks. The "set_false_path" command may be used to instruct a timing analysis tool to ignore one or more paths. Approaches that perform static timing analysis (STA) on both the pre- and post-transformation constraint sets may only consider critical paths to each end-point and may not cover all paths of the design. Comparison of clocks and timing states across each and every timing path of the design is a very expensive task as it involves path enumeration.

Embodiments described herein may compare the timing constraint behavior between two designs, where the two designs may be structurally different but logically the same. Embodiments described herein efficiently compare the effect of timing constraints on each path across the different sets of constraints without enumerating all paths. Specifically, some embodiments described herein may use a multi-pass process, where the number of paths is pruned in each pass.

Advantages of embodiments described herein include, but are not limited to, efficiently verifying equivalence of constraints after transformations, identifying a source of inconsistency with necessary debug features to the user, and reducing the turnaround time (TAT) for fixing constraint inconsistencies.

Figure 1:
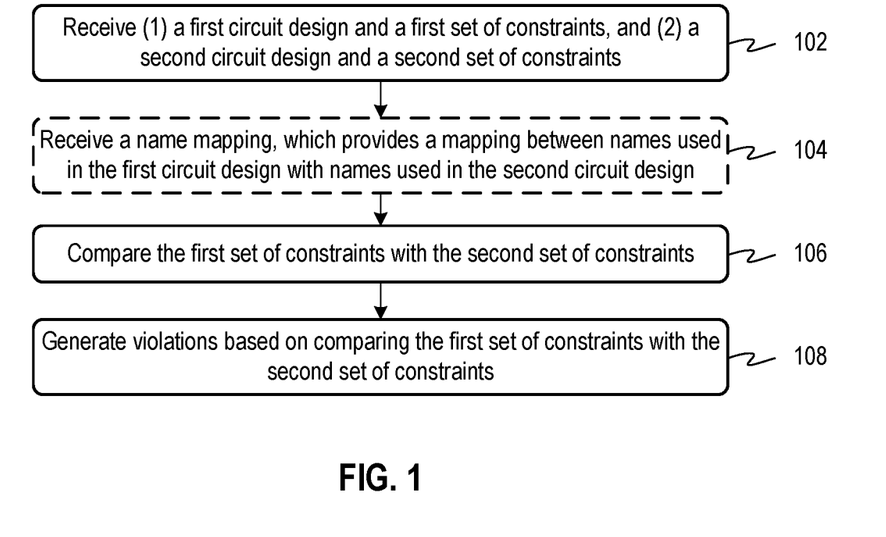
FIG. 1 illustrates a process for performing a constraint equivalence check in accordance with some embodiments described herein.

FIG. 1 illustrates a process for performing a constraint equivalence check in accordance with some embodiments described herein.

A first circuit design and a first set of constraints, and a second circuit design and a second set of constraints may be received (at 102). Specifically, a user may load two designs and the respective constraints in an EDA software application which may execute on a processor. Specifically, a user interface command, e.g., "compare_constraints," may accept the following arguments: the two circuit designs to be compared and the respective set of constraints that are desired to be compared.

In some embodiments described herein, a name mapping may be optionally received, which may provide a mapping between names used in the first circuit design with names used in the second circuit design (at 104). Specifically, an object matcher may be used by embodiments described herein to process a name mapping file, which may allow embodiments described herein to map the names of the changed objects between the two designs, e.g., design1 and design2. In design transformations (not hierarchical transformations), the name mapping may specify the timing start/end point objects (where timing start/end objects points may correspond to pins/port in the circuit design). In hierarchical transformations, a mapping between the changed hierarchical cells may be specified.

For example, in some embodiments, the name mapping file may include a "define_name_maps" command and the name of objects to specify object mapping. The "define_name_maps" command may define name mapping for design objects, and may include the following arguments (with the associated command line flags): (1) an "-application" argument, which may be optional and may be used to specify the application for which the name map has been generated, (2) a "-design_name" argument to specify the design name, (3) a "-columns" argument to specify the column names that follow in the file, and (4) a set of entries that specify the name mapping. The object types for which a name mapping may be provided may include, but are not limited to, pins, ports, nets, and cells. Specifically, a user may specify the type of object being mapped in every entry in a "class" column.

The first set of constraints may be compared with the second set of constraints (at 106), and violations may be generated based on comparing the first set of constraints with the second set of constraints (at 108). Specifically, a violation may be generated when a constraint in the first set of constraints does not have a corresponding constraint in the second set of constraints, or vice versa.

Figure 2:
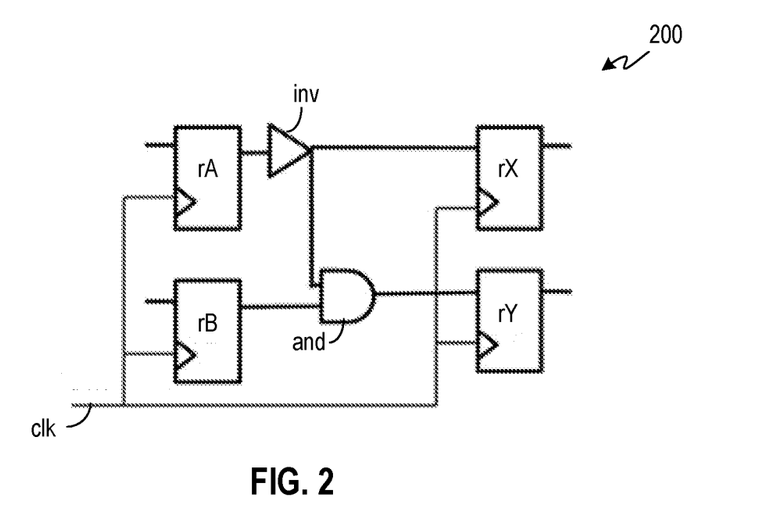
FIG. 2 illustrates a circuit design in accordance with some embodiments described herein.

FIG. 2 illustrates a circuit design in accordance with some embodiments described herein.

A timing constraint may be associated with a timing path. A timing path may generally be any path in a circuit design. A timing path may begin at a timing start-point (e.g., a primary input or an output port of a register) and end at a timing end-point (e.g., a primary output or an input port of a register). A clock that determines when a data signal changes at a timing start-point may be referred to as the launch clock, and a clock that determines when the value of a data signal is captured at the timing end-point may be referred to as the capture clock.

For example, circuit 200 includes registers rA, rB, rX, and rY, an inverter "inv," and an AND gate "and." Clock signal clk is provided to the registers. A timing path in FIG. 2 may begin at the output of register rA, pass through inverter "inv" and gate "and" and end at the input of register rY. For this timing path, register rA is the timing start-point, register rY is the timing end-point, the launch clock is clk, and the capture clock is clk.

A timing constraint may be associated with a timing path and a constraint state, where the constraint state may specify the impact of the timing constraint on the timing end-point. Examples of a timing constraint state include, but are not limited to, disabled, false path, multicycle path, or constant. A disabled timing path is removed from the circuit design during timing analysis. The timing of a false path is computed (i.e., it is not removed from the circuit design), but the calculated timing is ignored, i.e., the timing path never generates a timing violation. A multicycle path is a path whose required time is greater than a clock cycle, i.e., the propagation of a signal along a multicycle path can be greater than one clock cycle without causing a timing violation. The "constant" timing constraint means the signal does not rise or fall but stays the same. Typically, this is specified by using the "set_case_analysis" timing constraint. A constant timing constraint may also arise if a pin is electrically connected to a power supply voltage or ground voltage in the netlist. Thus, in some embodiments described herein, a timing constraint may be described by specifying the timing start-point, the timing end-point, the launch clock, the capture clock, and the constraint state.

Figure 3:
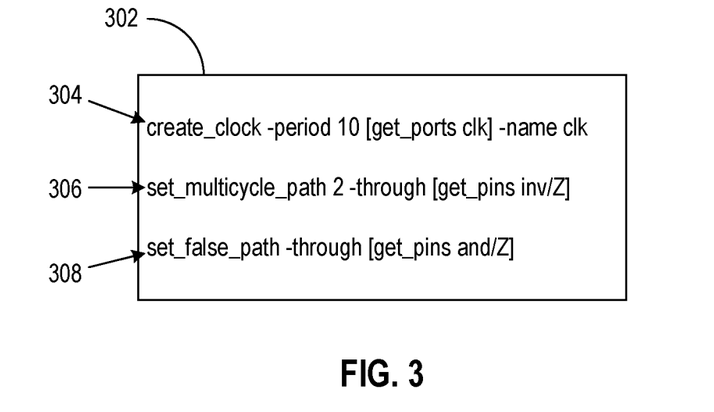
FIG. 3 illustrates a set of timing constraints corresponding to the circuit in FIG. 2 in accordance with some embodiments described herein.

FIG. 3 illustrates a set of timing constraints corresponding to the circuit in FIG. 2 in accordance with some embodiments described herein.

A set of timing constraints 302 includes timing constraints 304, 306, and 308. Timing constraint 304 (create_clock) specifies that the four registers shown in FIG. 2 are clocked by a clock signal "clk" which has a period of 10 units. Timing constraint 306 (set_multipath_path) specifies that all timing paths going through the output pin of the inverter "inv" require two clock cycles to propagate the data. The notation "inv/Z" is used to refer to the output pin ("Z") of inverter "inv." There are two paths that pass through pin "inv/Z": (1) a path that begins at the "Q" output of register rA and ends at the "D" input of register rX, i.e., the path rA/Q→inv/Z→rX/D, and (2) a path that begins at the "Q" output of register rA and ends at the "D" input of register rY, i.e., rA/Q→inv/Z→and/Z→rY/D. Timing constraint 308 (set_false_path) specifies that all timing paths going through the output pin of the AND gate (i.e., "and/Z") are to be treated as false paths. A false path is a timing path that is desired to be excluded from timing analysis.

There are two paths that pass through the pin "and/Z": (1) rA/Q→inv/Z→and/Z→rY/D, and (2) rB/Q→and/Z→rY/D. The second path, i.e., rB/Q→and/Z→rY/D, has both the false-path and the multicycle-path constraint state associated with it. An EDA system may define a set of precedence rules when multiple constraint states apply to a given path. For example, the false-path constraint state may have a higher precedence than the multicycle-path constraint state.

If the paths reaching a given timing end-point are bundled (i.e., combined into a single specification), then the set of timing constraints 302 may be represented using a set of timing relationships as shown in Table 1 below.

TABLE 1

| Timing start-point | Timing end-point | Launch clock | Capture clock | Timing constraint state |
|---|---|---|---|---|
| * | rX/D | Clk(r) | Clk(r) | MCP(2) |
| * | rY/D | Clk(r) | Clk(r) | FP |

Table 1 has five columns, a header row, and two rows that specify timing relationships. Approaches that use timing relationships to check equivalency may be referred to as behavioral comparison approaches. The timing relationship for a set of paths may be defined by its launch clock, capture clock, timing end/start point, rise/fall type, min/max path type and constraints states (disabled, false path, multicycle path, etc.) of the path. In some embodiments described herein, each timing relationship may be specified using the following parameters (which are shown in the header row of Table 1): (1) timing start-point, (2) timing end-point, (3) launch clock, (4) capture clock, and (5) timing constraint state. An asterisk symbol may be used as a wild card that may match any value.

The first row in Table 1 represents a timing relationship which corresponds to paths that begin at any timing start-point (because the asterisk symbol matches any timing start-point) and ends at pin rX/D (i.e., the input data pin of register rX in FIG. 2) as the timing end-point. The second row in Table 1 represents a timing relationship which corresponds to paths that begin at any timing start-point and ends at pin rY/D (i.e., the input data pin of register rY in FIG. 2) as the timing end-point.

Table 1 also illustrates how a set of timing constraints with different precedence can be modeled using timing relationships. For example, in the second row of Table 1, two timing paths end in timing end-point rY/D, where one of the paths (rA/Q→inv/Z→and/Z→rY/D) has a "multicycle path" timing constraint state and the other path (rB/Q→and/Z→rY/D) has a "false path" timing constraint state. However, the timing constraint state of the second row only shows the false path timing constraint state because it has a higher precedence than the multicycle path timing constraint state. Thus, the timing relationships representation shown in Table 1 removes any dependency on how a timing constraint is specified and only models how it is applied and affects the timing paths in the design.

Two sets of constraints C1 and C2 corresponding to two designs, e.g., design1 and design2, may be defined to be equivalent if and only if: (1) every timing relationship of design1 obtained by applying the set of constraints C1 to design1 is present in the set of timing relationships of design2 obtained by applying the set of constraints C2 to design 2, and (2) every timing relationship of design2 obtained by applying the set of constraints C2 to design2 is present in the set of timing relationships of design1 obtained by applying the set of constraints C1 to design 1. This definition of timing constraint equivalence emphasizes comparison of the effect of timing constraints on the design without comparing the actual constraints themselves. For example, if a multicycle path constraint in design1 is rewritten for design2 so that it is specified on timing start-points instead of timing end-points, then the effect of the constraints on design1 and design2 may be the same even though a simple comparison of constraints may not be able to determine that the two sets of constraint are equivalent based on the above equivalence definition.

Figure 4:
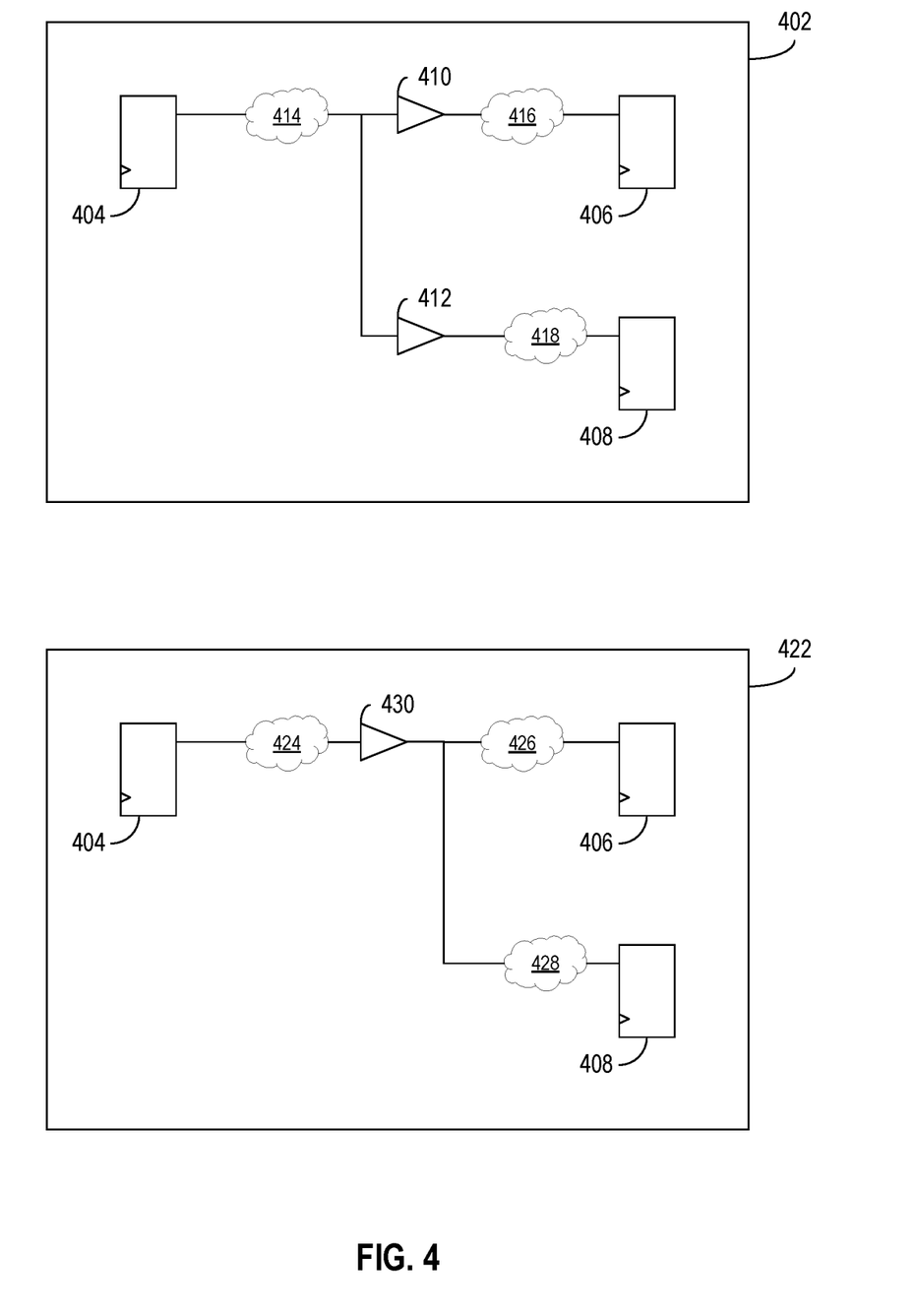
FIG. 4 illustrates comparing timing constraints in two circuit designs in accordance with some embodiments described herein.

FIG. 4 illustrates comparing timing constraints in two circuit designs in accordance with some embodiments described herein.

Circuit design 402 may be transformed to obtain circuit design 422. In both circuit designs 402 and 422, the timing constraints may specify timing paths between registers 404, 406, and 408. However, the circuitry in the timing paths may change between circuit design 402 and 422. For example, in circuit design 402, the timing path from register 404 to register 406 passes through combinational logic circuitry 414, buffer 410, and combinational logic circuitry 416. On the other hand, in circuit design 422, the timing path from register 404 to register 406 passes through combinational logic circuitry 424, buffer 430, and combinational logic circuitry 426. Timing relationships (e.g., as shown in Table 1) may be determined for circuit design 402 based on the set of timing constraints (e.g., similar to the set of timing constraints 302 in FIG. 3) for circuit design 402, and timing relationships may be determined for circuit design 422 based on the set of timing constraints for circuit design 422. Equivalence between the set of timing constraints for circuit designs 402 and 422 may be determined based on matching the timing relationships for circuit designs 402 and 422.

If transforming a circuit design modifies objects or object names (e.g., registers or register names) which define the timing start-points and/or timing end-points, then a name mapping may be used for matching the timing relationships. For example, in a first circuit design, suppose a first timing relationship exists between a first register and a second register. Further, suppose that the first circuit design is transformed into a second circuit design, and the first register is replaced with a third register during the transformation. In this example, the name mapping may map the first register in the first circuit design to the third register in the second circuit design. The name mapping may be used to match the first timing relationship between the first register and the second register in the first circuit design with a second timing relationship between the third register and the second register in the second circuit design.

Embodiments described herein may receive a name mapping which identifies corresponding objects in two designs. A comparison engine can make use of this mapping to perform equivalence checking on corresponding objects in both designs. Different types of design transformation that may occur during design optimization and that can be handled by embodiments described herein include, but are not limited to, (1) cloning/de-cloning of cells, (2) gate compression/de-compression, (3) multi-bit flip-flop banking/de-banking, (4) logic re-structuring, and (5) grouping/un-grouping of cells.

Figure 5:
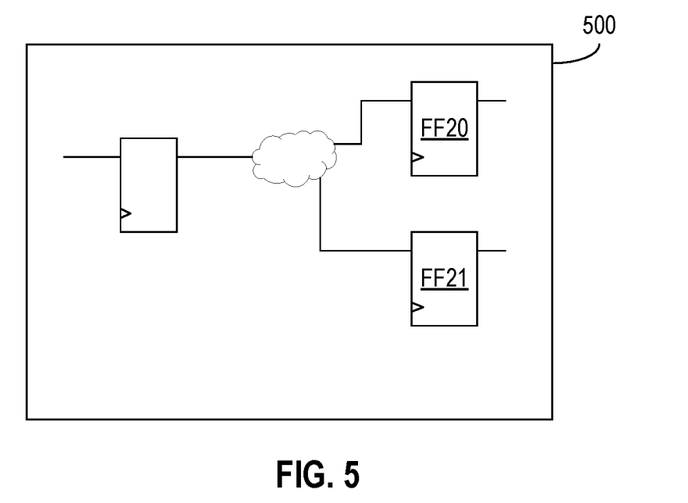
FIGS. 5-6 illustrate an example of using name mapping for performing timing constraint equivalence checking between two circuit designs in accordance with some embodiments described herein.
Figure 6:
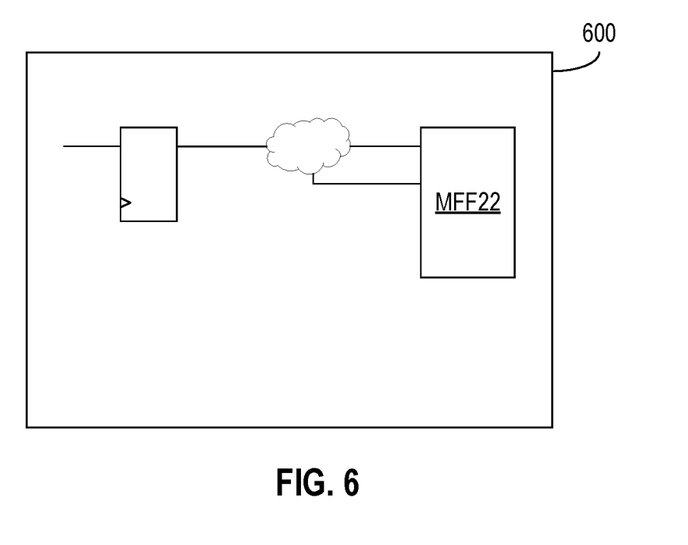

FIGS. 5-6 illustrate an example of using name mapping for performing timing constraint equivalence checking between two circuit designs in accordance with some embodiments described herein.

Circuit design 500 in FIG. 5 may be transformed to obtain circuit design 600 in FIG. 6 by replacing registers FF20 and FF21 in circuit design 500 with a single multi-bit register MFF22 in circuit design 600. A first set of timing constraints may be specified for circuit design 500 and a second set of timing constraints may be specified for circuit design 600, where the first set of timing constraints and the second set of timing constraints may have the same timing intent.

For example, the first set of timing constraints for circuit design 500 may include a timing constraint with a timing end-point at the "D" input pin of register FF20, and a timing constraint with a timing end-point at the "D" input pin of register FF21. The second set of timing constraints for circuit design 60 may include a timing constraint with timing end-points at the "D0" and "D1" input pins of multi-bit register MFF22. The names of the timing end-points were changed when circuit design 500 was transformed to circuit design 600. In some embodiments described herein, a name mapping may be provided to map "D" input pin of register FF20 and the "D" input pin of register FF21 to the "D0" and "D1" input pins of multi-bit register MFF22, respectively.

Figure 7:
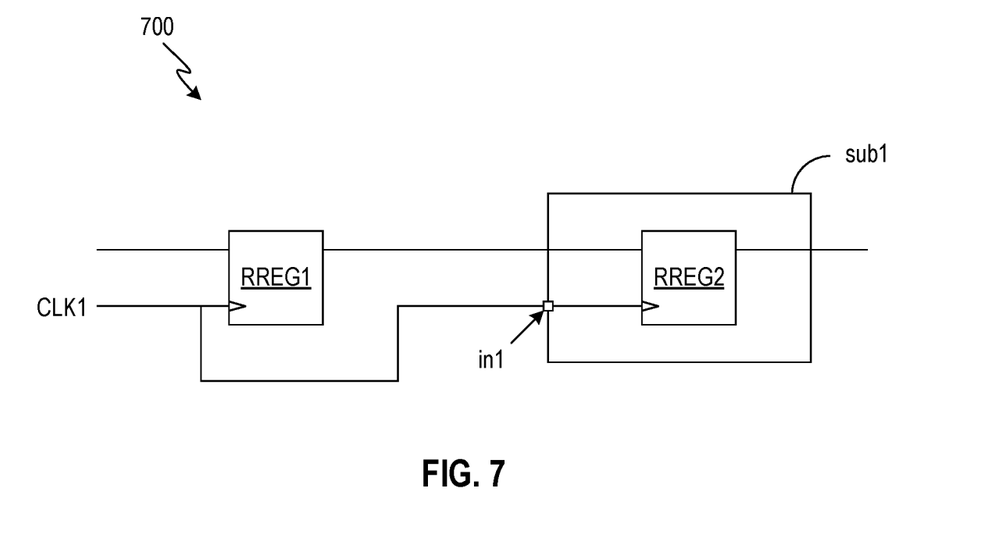
FIGS. 7-8 illustrate an example of performing timing constraint equivalency checking between two designs with a hierarchical transformation in accordance with some embodiments described herein.
Figure 8:
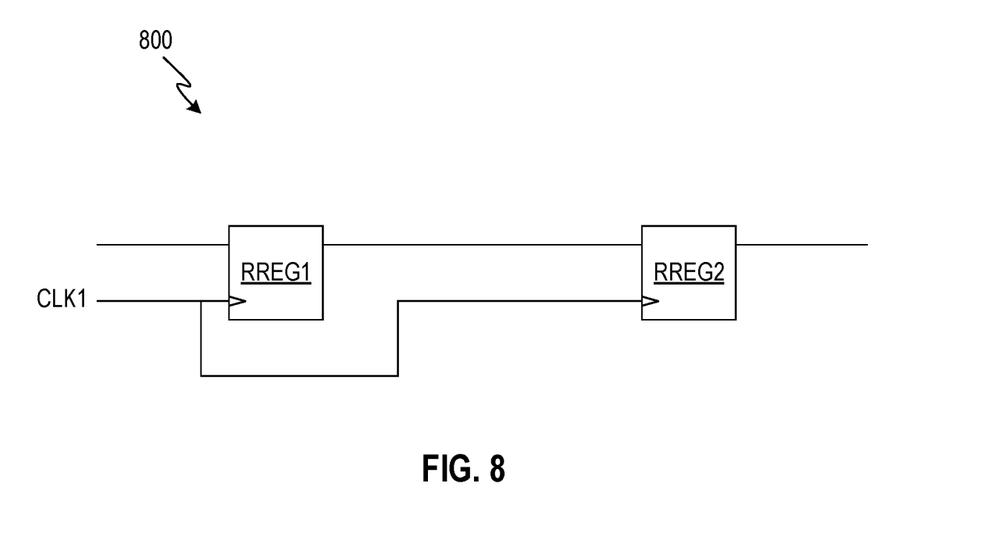

FIGS. 7-8 illustrate an example of performing timing constraint equivalency checking between two designs with a hierarchical transformation in accordance with some embodiments described herein.

Circuit design 700 in FIG. 7 includes registers RREG1 and RREG2. Register RREG2 is inside hierarchical cell sub1. In circuit design 800 in FIG. 8, hierarchical cell sub1 has been flattened, i.e., the circuitry within hierarchical cell sub1 is now shown without hierarchical cell sub1 enclosing the circuitry. For example, sub1 is no longer shown enclosing register RREG1 in FIG. 8, such that RREG2 is at the same hierarchical level as RREG1.

A name mapping may be used to check consistency between a first set of timing constraints specified for circuit design 700 and a second set of timing constraints specified for circuit design 800. For example, the first set of timing constraints for circuit design 700 may specify that the path from clock pin CLK1 to input in2 of hierarchical cell sub1 is a false path, i.e., this path is to be ignored during timing analysis. The second set of timing constraints for circuit design 800 may not include a corresponding false path specification. The hierarchical cell sub1 is not present in circuit design 800. In some embodiments described herein, a name mapping may be provided to map "in1" input pin of hierarchical cell sub1 in circuit design 700 to the clock input of register RREG2 in circuit design 800. Embodiments described herein may use the name mapping to determine that the second set of timing constraints for circuit design 800 does not include the false path timing constraint that was present in the first set of timing constraints for circuit design 700.

Figure 9:
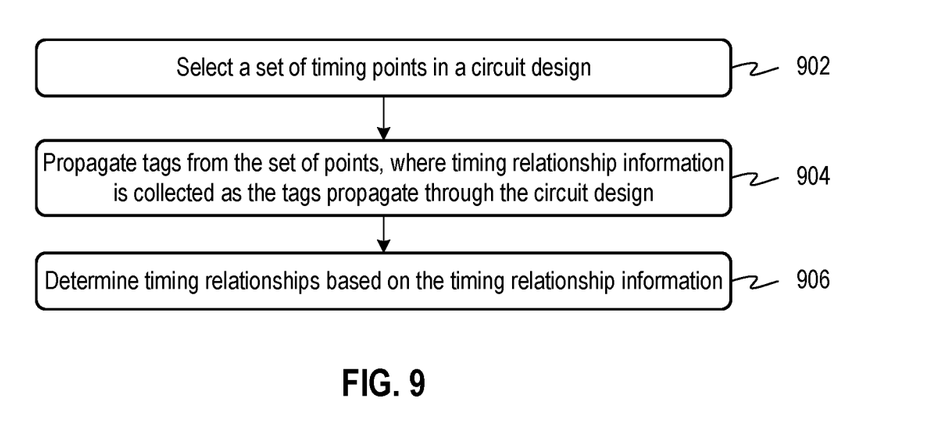
FIG. 9 illustrates a process for determining timing relationships in accordance with some embodiments described herein.

FIG. 9 illustrates a process for determining timing relationships in accordance with some embodiments described herein.

A set of timing points may be selected in a circuit design (at 902). A timing point may be a timing start-point or a timing end-point. A set of tags may be propagated from the set of points, where timing relationship information is collected as the set of tags propagate through the circuit design (at 904). A tag may refer to a software object (e.g., a data structure) that can store timing relationship information related to a path which is being traversed. Propagating a tag data structure through the circuit design may refer to tracing a path in a circuit design from a first point (e.g., a timing start-point or a timing end-point) to a second point (e.g., a timing end-point or a timing start-point), where at each circuit object along the path, information stored in the tag may be updated or modified.

A path in a circuit design may be traversed (e.g., by propagating a tag) in the forward direction or backward direction. The forward direction may refer to traversing the path from a timing start-point to a timing end-point. The reverse direction may refer to traversing the path from a timing end-point to a timing start-point.

Timing relationships may be computed by traversing along a circuit path (either from a timing end-point to an timing start-point or from a timing start-point to an timing end-point) and recording constraints, which may include, but are not limited to, clock, exceptions, and disabled conditions. When the process reaches a terminating point (either a timing start-point or a timing end-point), the final states of exceptions may be computed by taking both launch and capture clocks into account.

The set of timing relationships may be determined based on the timing relationship information (at 906). A timing relationship may be specified using one or more timing start-points, a timing end-point, a launch clock, a capture clock, and a timing constraint state. For example, each row in Table 1 corresponds to a timing relationship. Timing relationship information may refer to one piece of data in a timing relationship. For example, the timing constraint state "FP" in the second row of Table 1 is an example of timing relationship information.

Figure 10:
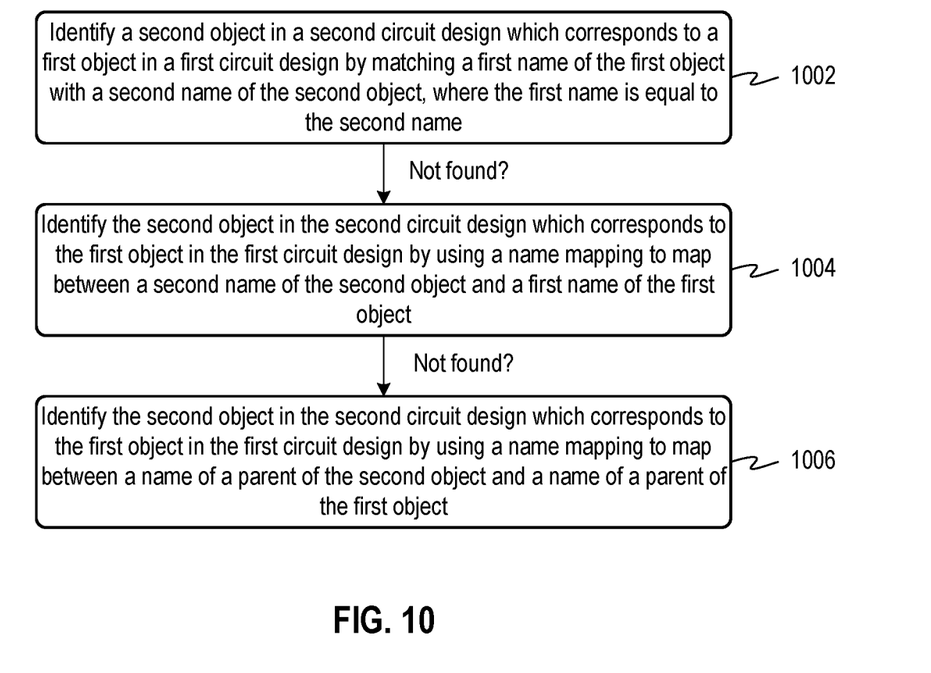
FIG. 10 illustrates a process for identifying a second object in a second circuit design that corresponds to a first object in a first circuit design in accordance with some embodiments described herein.

FIG. 10 illustrates a process for identifying a second object in a second circuit design that corresponds to a first object in a first circuit design in accordance with some embodiments described herein.

The term "object" may generally refer to any design element in a circuit design. Examples of objects include, but are not limited to, a pin, a terminal, a logic gate, a register, a cell, and a hierarchical cell. A second object in a second circuit design may be identified which corresponds to a first object in a first circuit design by matching a first name of the first object with a second name of the second object, where the first name is equal to the second name (at 1002). If the corresponding second object is not found at 1002, the second object in the second circuit design which corresponds to the first object in the first circuit design may be identified by using a name mapping to map between a second name of the second object and a first name of the first object (at 1004). If the corresponding second object is not found at 1004, the second object in the second circuit design which corresponds to the first object in the first circuit design may be identified by using a name mapping to map between a name of a parent of the second object and a name of a parent of the first object (at 1006).

The process illustrated in FIG. 10 may be implemented by an object matcher (which may be a set of instructions that execute on a processor). An object matcher may be used to determine corresponding comparison points in two designs. If the transformation is performed by a single EDA application, a separate name mapping may not be used because the EDA application may internally store the mapping information.

A brute force approach that attempts to compare each path in the design can be computationally expensive because it may enumerate all timing paths of both circuit designs and determine equivalence of the timing relationships for each timing path. Embodiments described herein can perform equivalence checking without performing a brute force comparison for every timing path in the two designs.

Embodiments described herein may feature a multi-pass comparison process, which may include, but is not limited to (1) using a multi-pass gradual refinement approach that selects points on the timing path where timing relationships are desired to be compared, (2) identifying timing relationships that are exactly the same in the two circuit designs, so that any ambiguities in paths due complex timing constraints are handled at later passes, and (3) performing a strategic path selection that achieves closure of simpler paths with less computations and uses detailed comparisons with parallel computation capability for complex paths.

In other words, instead of comparing timing relationships of each individual path (which can be expensive in terms of runtime), the multi-pass approach used by embodiments described herein may analyze the timing relationships of a set of paths and refine the set of paths as necessary for performing a more detailed analysis.

Figure 11:
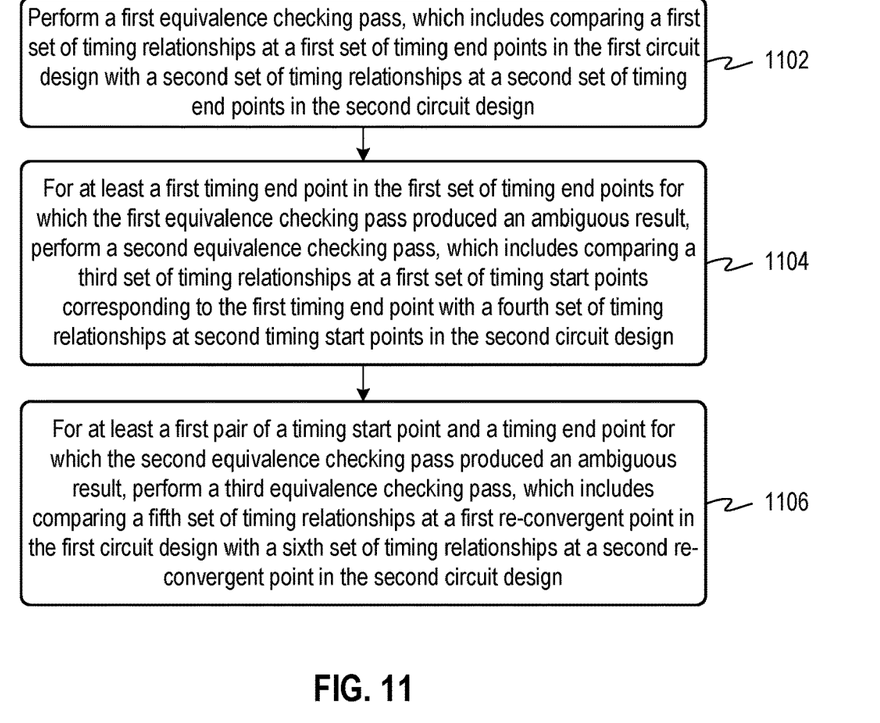
FIG. 11 illustrates a process for comparing two sets of timing relationships in accordance with some embodiments described herein.

FIG. 11 illustrates a process for comparing two sets of timing relationships in accordance with some embodiments described herein.

A first equivalence checking pass may be performed, which includes comparing a first set of timing relationships at a first set of timing end-points in a first circuit design with a second set of timing relationships at a second set of timing end-points in a second circuit design (at 1102).

In other words, at 1102, the timing relationships may be compared to determine matches/mismatches for all paths reaching a timing end-point. This comparison may be performed quickly, i.e., it may use few computational resources. If the timing relationships in the first design and the second design at a timing end-point are not the same (i.e., if the comparison cannot definitely determine whether the timing relationship is equivalent), then the timing end-point to a second comparison. Thus, the timing relationships whose equivalency can be determined in the first comparison may not be provided to the second comparison. Specifically, the number of timing relationships that are processed by the second comparison may be significantly less than the number of timing relationships that are processed by the first comparison.

For at least a first timing end-point in the first set of timing end-points for which the first equivalence checking pass produced an ambiguous result, a second equivalence checking pass may be performed, which includes comparing a third set of timing relationships at a first set of timing start-points corresponding to the first timing end-point with a fourth set of timing relationships at second timing start-points in the second circuit design (at 1104).

Specifically, in the second comparison, timing relationships may be compared to determine matches/mismatches for all paths between a specific timing start-point and a specific timing end-point. If equivalency of the timing relationships cannot be determined based on the second comparison (i.e., if the second comparison cannot determine whether the timing relationship is equivalent), then the timing relationships for this pair of timing start-point and timing end-point may be provided to a third comparison. One reason why equivalency may not be determined by the second comparison is because of re-convergent logic in the path from the timing start-point to the timing end-point. Re-convergent logic may refer to a situation where multiple distinct paths exist between a given timing start-point and a timing end-point. The timing relationships whose equivalency can be determined by second comparison may not passed to the third comparison. Thus, the number of timing relationships that are processed in the third comparison may be significantly less than the number of timing relationships that are processed in the second comparison.

For at least a first pair of a timing start-point and a timing end-point for which the second equivalence checking pass produced an ambiguous result, a third equivalence checking pass may be performed, which includes comparing a fifth set of timing relationships at a first re-convergent point in the first circuit design with a sixth set of timing relationships at a second re-convergent point in the second circuit design (at 1106).

Specifically, timing relationships may be compared to determine matches/mismatches for all re-convergent points between a timing start-point and a timing end-point. A re-convergent point is a point where multiple paths diverge or converge between a timing start-point and a timing end-point. For example, suppose a first path between timing start-point A and timing end-point E is as follows: A→B→C→D→E. Suppose a second path between timing start-point A and timing end-point E is as follows: A→B→F→D→E. In this example, points B and D are re-convergent points.

In some embodiments described herein, timing relationships of two designs may be stored with respect to a reference design's (i.e., the first circuit design) objects. For example, timing relationships may be stored in a database as key-value pairs, where the names of timing end-points, timing start-points, and re-convergent points in a reference design (e.g., the first circuit design) may be used as the "key," and the timing relationship data (e.g., the information in a given row of Table 1) may be stored as the "value."

In some embodiments described herein, the process shown in FIG. 11 may mark objects of the reference design (e.g., the first circuit design) for performing the next comparison. To perform tag propagation for the second or third comparison, the process may utilize the object matcher (which may implement the process shown in FIG. 10) to determine matching objects between the first circuit design and the second circuit design.

Figure 12:
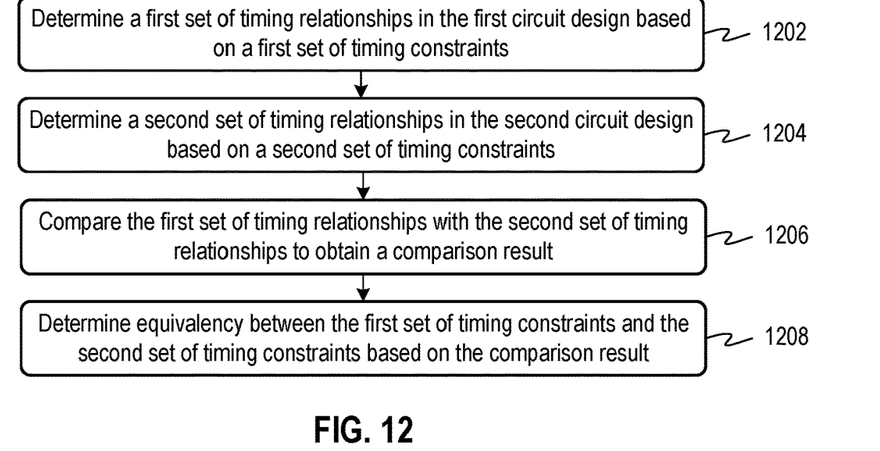
FIG. 12 illustrates a process for timing constraint equivalence checking on circuit designs in accordance with some embodiments described herein.

FIG. 12 illustrates a process for timing constraint equivalence checking on circuit designs in accordance with some embodiments described herein.

A first set of timing relationships in a first circuit design may be determined based on a first set of timing constraints (at 1202). A second set of timing relationships in a second circuit design may be determined based on a second set of timing constraints (at 1204). For example, the timing relationships shown in Table 1 may be determined using the process shown in FIG. 9.

The first set of timing relationships may be compared with the second set of timing relationships to obtain a comparison result (at 1206). For example, the process shown in FIG. 11 may be used to perform the comparison. During the comparison, the process shown in FIG. 10 may be used to determine corresponding objects in two circuit designs.

Equivalency between the first set of timing constraints and the second set of timing constraints may be determined based on the comparison result (at 1208). If it is determined that a constraint is not equivalent between the two designs, embodiments described herein can identify the reason for the mismatch, e.g., a timing constraint is missing in one of the designs or has a different intent (e.g., different timing constraint states). In case of non-equivalence, embodiments described herein may provide the details of the timing constraint and the timing paths which caused the mismatch.

Embodiments described herein may generate a report of inconsistencies and facilitate debugging of inconsistencies. Specifically, a set of native rules to check the various consistency of constraints like clock, exceptions, delays may be used. A narrowed path/constraints information may be provided to the user, along with debug commands. Violations identified by embodiments described herein may be used for scripting, and for providing query, control, and waiver mechanisms.

Figure 13:
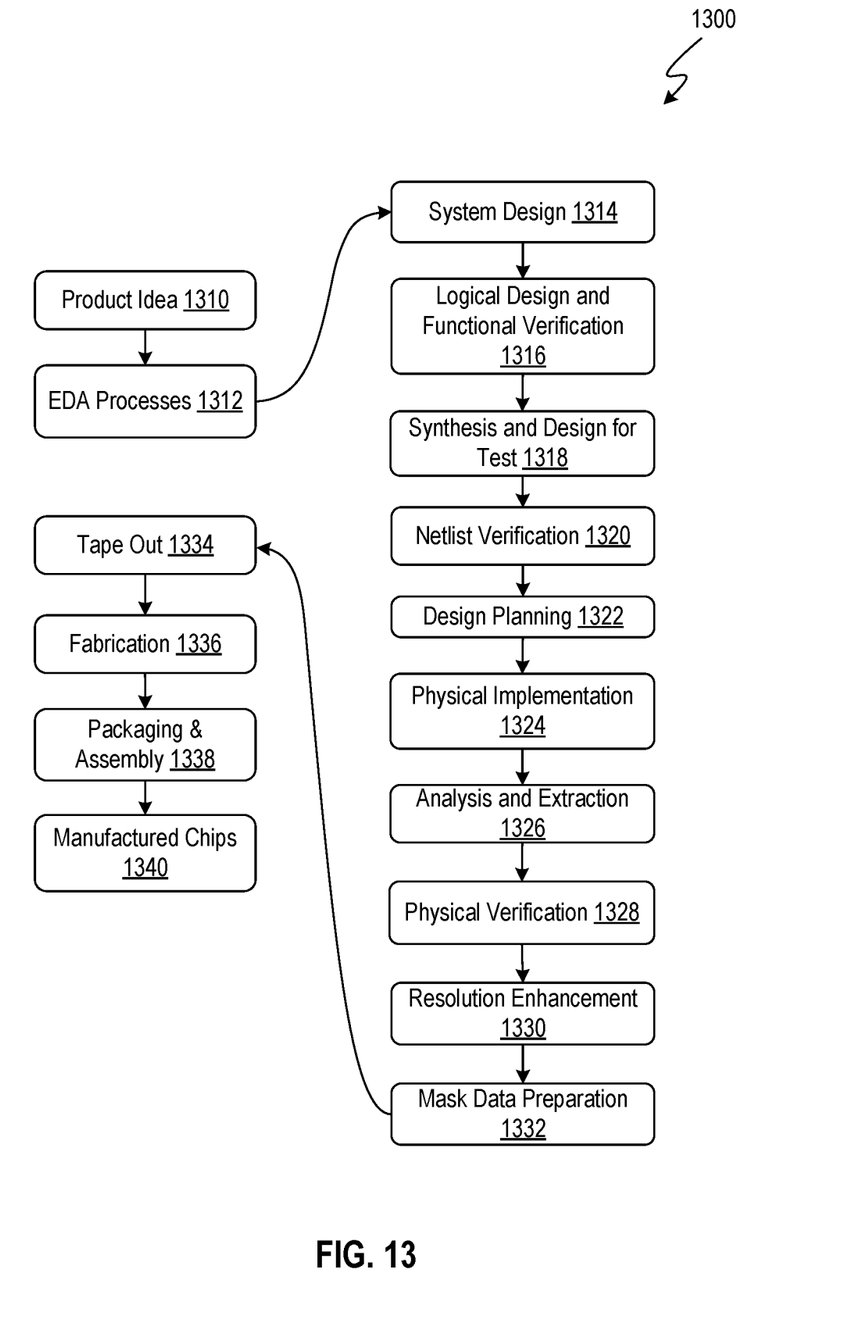
FIG. 13 illustrates an example flow for the design, verification, and fabrication of an integrated circuit in accordance with some embodiments described herein.

FIG. 13 illustrates an example flow for the design, verification, and fabrication of an integrated circuit in accordance with some embodiments described herein.

EDA processes 1312 (the acronym "EDA" refers to "Electronic Design Automation") can be used to transform and verify design data and instructions that represent the integrated circuit. Each of these processes can be structured and enabled as multiple modules or operations.

Flow 1300 can start with the creation of a product idea 1310 with information supplied by a designer, information which is transformed and verified by using EDA processes 1312. When the design is finalized, the design is taped-out 1334, which is when artwork (e.g., geometric patterns) for the integrated circuit is sent to a fabrication facility to manufacture the mask set, which is then used to manufacture the integrated circuit. After tape-out, a semiconductor die is fabricated 1336 and packaging and assembly 1338 are performed to produce the manufactured IC chip 1340.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more concrete description adds more detail into the design description. The lower levels of representation that are more concrete descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 1314, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1316, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 1318, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1320, the netlist is checked for compliance with timing constraints and for correspondence with the HDL code. During design planning 1322, an overall floor plan for the integrated circuit is constructed and analyzed for timing and top-level routing.

During layout or physical implementation 1324, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1326, the circuit function is verified at the layout level, which permits refinement of the layout design. During physical verification 1328, the layout design is checked to ensure that manufacturing constraints are correct, such as DRC constraints, electrical constraints, lithographic constraints, and that circuitry function matches the HDL design specification. During resolution enhancement 1330, the geometry of the layout is transformed to improve how the circuit design is manufactured.

During tape-out, data is created to be used (after lithographic enhancements are applied if appropriate) for production of lithography masks. During mask data preparation 1332, the 'tape-out' data is used to produce lithography masks that are used to produce finished integrated circuits.

A storage subsystem of a computer system (such as computer system 1400 in FIG. 14) may be used to store the programs and data structures that are used by embodiments described herein.

Figure 14:
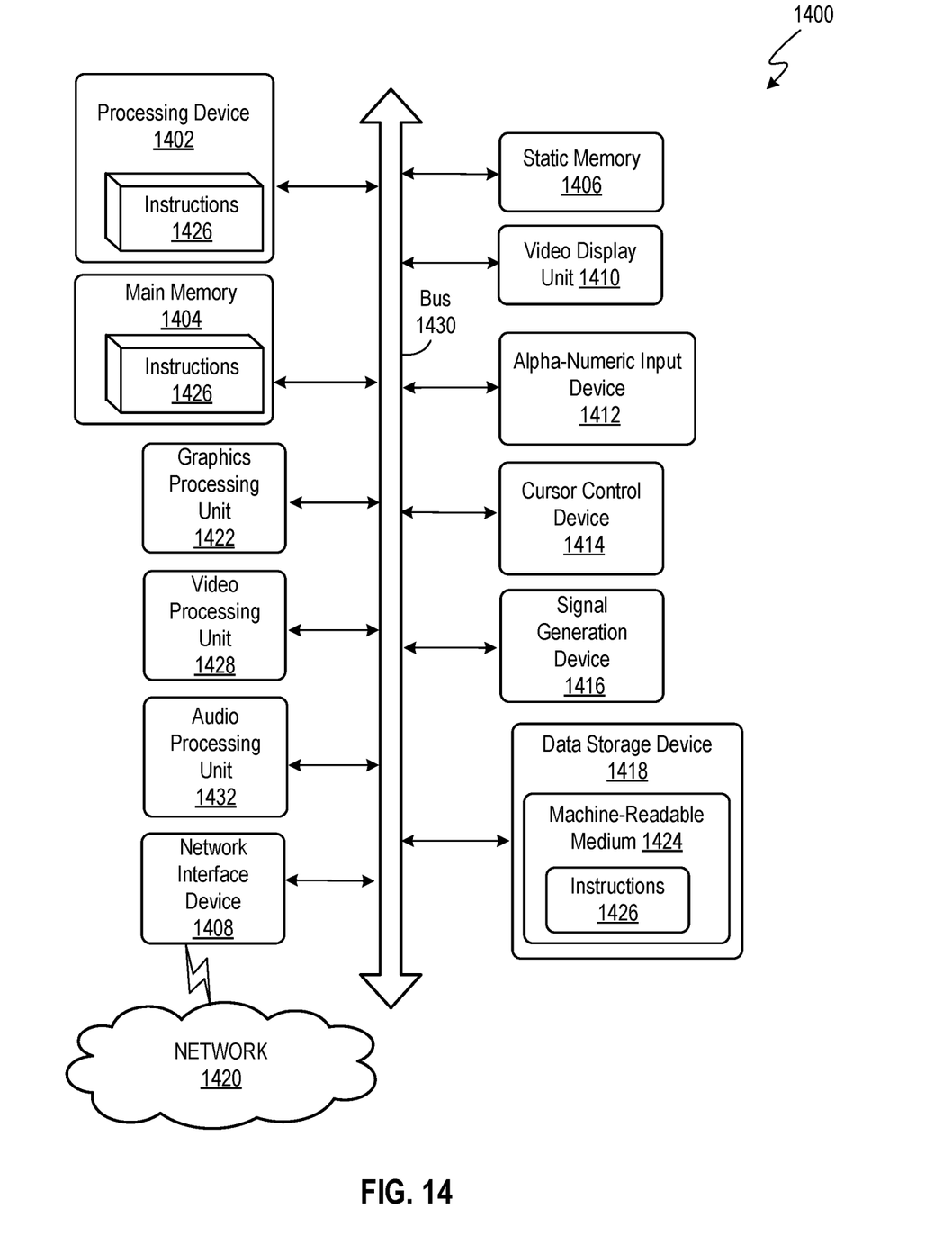
FIG. 14 illustrates an example machine of a computer system within which a set of instructions, for causing the machine to perform any one or more of the methodologies discussed herein, may be executed.

FIG. 14 illustrates an example machine of a computer system within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM), a static memory 1406 (e.g., flash memory, static random access memory (SRAM), etc.), and a data storage device 1418, which communicate with each other via a bus 1430.

Processing device 1402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 may be configured to execute instructions 1426 for performing the operations and steps described herein.

The computer system 1400 may further include a network interface device 1408 to communicate over the network 1420. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a graphics processing unit 1422, a signal generation device 1416 (e.g., a speaker), graphics processing unit 1422, video processing unit 1428, and audio processing unit 1432.

The data storage device 1418 may include a machine-readable storage medium 1424 (also known as a non-transitory computer-readable medium) on which is stored one or more sets of instructions 1426 or software embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media.

In some implementations, the instructions 1426 include instructions to implement functionality corresponding to the present disclosure. While the machine-readable storage medium 1424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1402 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various design modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    determining a first set of timing relationships in a first circuit design based on a first set of timing constraints specified for the first circuit design;
    determining a second set of timing relationships in a second circuit design based on a second set of timing constraints specified for the second circuit design;
    comparing the first set of timing relationships with the second set of timing relationships to obtain a comparison result; and
    determining, by a processor, equivalency between the first set of timing constraints and the second set of timing constraints based on the comparison result.

2. The method of claim 1, wherein the determining the first set of timing relationships in the first circuit design comprises:
    selecting a first set of timing points in the first circuit design;
    propagating a first set of tags from the first set of points, wherein first timing relationship information is collected as the first set of tags propagate through the first circuit design; and
    determining the first set of timing relationships based on the first timing relationship information.

3. The method of claim 1, wherein the determining the second set of timing relationships in the second circuit design comprises:
    selecting a second set of timing points in the second circuit design;
    propagating a second set of tags from the second set of points, wherein second timing relationship information is collected as the second set of tags propagate through the second circuit design; and
    determining the second set of timing relationships based on the second timing relationship information.

4. The method of claim 1, wherein the comparing the first set of timing relationships with the second set of timing relationships to obtain the comparison result comprises performing a first comparison between (1) a first timing relationship in the first set of timing relationships which ends at a first timing end-point in the first circuit design, and (2) a second timing relationship in the second set of timing relationships which ends at a second timing end-point in the second circuit design, wherein the first timing end-point corresponds to the second timing end-point.

5. The method of claim 4, wherein a name mapping is used to determine correspondence between the first timing end-point and the second timing end-point.

6. The method of claim 4, wherein the comparing the first set of timing relationships with the second set of timing relationships to obtain the comparison result further comprises performing a second comparison between (1) a third timing relationship in the first set of timing relationships which begins at a first timing start-point corresponding to the first timing end-point in the first circuit design, and (2) a fourth timing relationship in the second set of timing relationships which begins at a second timing start-point corresponding to the second timing end-point in the second circuit design, wherein the first timing start-point corresponds to the second timing start-point.

7. The method of claim 6, wherein the comparing the first set of timing relationships with the second set of timing relationships to obtain the comparison result further comprises performing a third comparison between (1) a fifth timing relationship in the first set of timing relationships at a first re-convergent point between the first timing start-point and the first timing end-point, and (2) a sixth timing relationship in the second set of timing relationships at a second re-convergent point between the second timing start-point and the second timing end-point, wherein the first re-convergent point corresponds to the second re-convergent point.

8. The method of claim 1, wherein each timing relationship is specified using one or more timing start-points, a timing end-point, a launch clock, a capture clock, and a timing constraint state.

9. A non-transitory computer-readable medium comprising stored instructions, which when executed by a processor, cause the processor to:
    determine a first set of timing relationships in a first circuit design based on a first set of timing constraints specified for the first circuit design;
    determine a second set of timing relationships in a second circuit design based on a second set of timing constraints specified for the second circuit design;
    compare the first set of timing relationships with the second set of timing relationships to obtain a comparison result; and
    determine equivalency between the first set of timing constraints and the second set of timing constraints based on the comparison result.

10. The non-transitory computer-readable medium of claim 9, wherein the determining the first set of timing relationships in the first circuit design comprises:

selecting a first set of timing points in the first circuit design;

propagating a first set of tags from the first set of points, wherein first timing relationship information is collected as the first set of tags propagate through the first circuit design; and determining the first set of timing relationships based on the first timing relationship information.

11. The non-transitory computer-readable medium of claim 9, wherein the determining the second set of timing relationships in the second circuit design comprises:

selecting a second set of timing points in the second circuit design;

propagating a second set of tags from the second set of points, wherein second timing relationship information is collected as the second set of tags propagate through the second circuit design; and determining the second set of timing relationships based on the second timing relationship information.

12. The non-transitory computer-readable medium of claim 9, wherein the comparing the first set of timing relationships with the second set of timing relationships to obtain the comparison result comprises performing a first comparison between (1) a first timing relationship in the first set of timing relationships which ends at a first timing end-point in the first circuit design, and (2) a second timing relationship in the second set of timing relationships which ends at a second timing end-point in the second circuit design, wherein the first timing end-point corresponds to the second timing end-point.

13. The non-transitory computer-readable medium of claim 12, wherein a name mapping is used to determine correspondence between the first timing end-point and the second timing end-point.

14. The non-transitory computer-readable medium of claim 12, wherein the comparing the first set of timing relationships with the second set of timing relationships to obtain the comparison result further comprises performing a second comparison between (1) a third timing relationship in the first set of timing relationships which begins at a first timing start-point corresponding to the first timing end-point in the first circuit design, and (2) a fourth timing relationship in the second set of timing relationships which begins at a second timing start-point corresponding to the second timing end-point in the second circuit design, wherein the first timing start-point corresponds to the second timing start-point.

15. The non-transitory computer-readable medium of claim 14, wherein the comparing the first set of timing relationships with the second set of timing relationships to obtain the comparison result further comprises performing a third comparison between (1) a fifth timing relationship in the first set of timing relationships at a first re-convergent point between the first timing start-point and the first timing end-point, and (2) a sixth timing relationship in the second set of timing relationships at a second re-convergent point between the second timing start-point and the second timing end-point, wherein the first re-convergent point corresponds to the second re-convergent point.

16. The non-transitory computer-readable medium of claim 9, wherein each timing relationship is specified using one or more timing start-points, a timing end-point, a launch clock, a capture clock, and a timing constraint state.

17. An apparatus, comprising:

a memory storing instructions; and a processor, coupled with the memory and to execute the instructions, the instructions when executed causing the processor to:

determine a first set of timing relationships in a first circuit design based on a first set of timing constraints specified for the first circuit design;

determine a second set of timing relationships in a second circuit design based on a second set of timing constraints specified for the second circuit design;

wherein each timing relationship is specified using one or more timing start-points, a timing end-point, a launch clock, a capture clock, and a timing constraint state;

compare the first set of timing relationships with the second set of timing relationships to obtain a comparison result; and determine equivalency between the first set of timing constraints and the second set of timing constraints based on the comparison result.

18. The apparatus of claim 17, wherein the determining the first set of timing relationships in the first circuit design comprises:

selecting a first set of timing points in the first circuit design;

propagating a first set of tags from the first set of points, wherein first timing relationship information is collected as the first set of tags propagate through the first circuit design; and determining the first set of timing relationships based on the first timing relationship information.

19. The apparatus of claim 17, wherein the determining the second set of timing relationships in the second circuit design comprises:

selecting a second set of timing points in the second circuit design;

propagating a second set of tags from the second set of points, wherein second timing relationship information is collected as the second set of tags propagate through the second circuit design; and determining the second set of timing relationships based on the second timing relationship information.

20. The apparatus of claim 17, wherein the comparing the first set of timing relationships with the second set of timing relationships to obtain the comparison result comprises performing a first comparison between (1) a first timing relationship in the first set of timing relationships which ends at a first timing end-point in the first circuit design, and (2) a second timing relationship in the second set of timing relationships which ends at a second timing end-point in the second circuit design, wherein the first timing end-point corresponds to the second timing end-point.

\* \* \* \* \*